United States Patent
Stipanicev et al.

(10) Patent No.: US 12,441,926 B2
(45) Date of Patent: Oct. 14, 2025

(54) SCALE INHIBITOR COMPOSITIONS AND METHODS OF USING THE SAME

(71) Applicant: Cameron International Corporation, Houston, TX (US)

(72) Inventors: Marko Stipanicev, Sandsli (NO); Alexander Colin Nelson, Sandsli (NO)

(73) Assignee: CAMERON INTERNATIONAL CORPORATION, Houston, TX (US)

(*) Notice: Subject to any disclaimer, the term of this patent is extended or adjusted under 35 U.S.C. 154(b) by 139 days.

(21) Appl. No.: 18/257,972

(22) PCT Filed: Dec. 16, 2021

(86) PCT No.: PCT/US2021/063841
§ 371 (c)(1),
(2) Date: Jun. 16, 2023

(87) PCT Pub. No.: WO2022/133106
PCT Pub. Date: Jun. 23, 2022

(65) Prior Publication Data
US 2024/0052229 A1    Feb. 15, 2024

Related U.S. Application Data

(60) Provisional application No. 63/199,299, filed on Dec. 18, 2020.

(51) Int. Cl.
C09K 8/035    (2006.01)
C09K 8/528    (2006.01)
C09K 8/54     (2006.01)

(52) U.S. Cl.
CPC ............. *C09K 8/035* (2013.01); *C09K 8/528* (2013.01); *C09K 8/54* (2013.01)

(58) Field of Classification Search
CPC .......... C09K 8/035; C09K 8/528; C09K 8/54; C09K 8/504; C09K 8/508
See application file for complete search history.

(56) References Cited

U.S. PATENT DOCUMENTS 6,379,612 B1    4/2002   Reizer
6,767,989 B2    7/2004   Davis
(Continued)

FOREIGN PATENT DOCUMENTS

EP    0491391 B1    6/1992
EP    0861846 B1    9/1998
(Continued)

OTHER PUBLICATIONS

International Preliminary Report on Patentability issued in PCT Application No. PCT/US2021/063841 dated Jun. 29, 2023, 6 pages.
(Continued)

*Primary Examiner* — Aiqun Li
(74) *Attorney, Agent, or Firm* — Jeffrey D. Frantz

(57) ABSTRACT

Scale inhibitor compositions and methods for treating a subterranean hydrocarbon producing formation and/or oilfield equipment are disclosed. The scale inhibitor composition comprises a scale inhibitor comprising at least one copolymer, a corrosion inhibitor comprising at least one acid, a neutralizing agent, and an optional solvent. The methods inhibit corrosion of metal surfaces by contacting at least one metal surface with at least one scale inhibitor composition and treat the subterranean formation by contacting a subterranean zone of the subterranean formation with the scale inhibitor composition such that corrosive effects of an acidizing composition on metal surfaces in contact therewith are reduced.

20 Claims, 9 Drawing Sheets

(56) References Cited

U.S. PATENT DOCUMENTS

| | | |
|---|---|---|
| 7,572,381 B2 | 8/2009 | Talbot |
| 7,879,964 B2 | 2/2011 | Woodward |
| 7,943,058 B2 | 5/2011 | Hills |
| 2008/0217017 A1 | 9/2008 | Brown |
| 2012/0252706 A1 | 10/2012 | Steiner |
| 2013/0023449 A1 | 1/2013 | Heath |
| 2014/0128294 A1 | 5/2014 | Gatlin |

FOREIGN PATENT DOCUMENTS

| | | | |
|---|---|---|---|
| EP | 1278793 B1 | 1/2003 | |
| WO | 2009080498 A1 | 7/2009 | |
| WO | WO-2013152832 A1 * | 10/2013 | ................ C02F 5/12 |

OTHER PUBLICATIONS

International Search Report and Written Opinion in the PCT Application PCT/US2021/063841, dated Apr. 14, 2022 (9 pages).

Bhandari et al., Development of Low-Corrosivity Scale Inhibitors for Low Alloys Steels, Presented at Offshore Technology Conference held in Houston, Texas, USA, May 1-4, 2017 (10 pages).

* cited by examiner

| 7 days at 70C with F22 | 1 | 2 | 3 | 4 | 5 | 6 | 7 | 8 | 9 | 10 |
|---|---|---|---|---|---|---|---|---|---|---|
| Formulation/ Finished Product | | | | | | | | | | |
| Maleic Acid Ter Polymer | 20 | - | - | - | - | - | 20 | - | - | - |
| Vs-Co | - | 20 | - | - | - | - | - | 20 | - | - |
| Polyaspartate | - | - | 20 | - | - | - | - | - | 20 | - |
| VSA/AAEnd-Capped | - | - | - | 20 | - | - | - | - | - | 20 |
| PPCA | - | - | - | - | 20 | - | - | - | - | - |
| Phosphino-co polymer of acrylic acid + AMPS | - | - | - | - | - | 20 | - | - | - | - |
| Water | to 100% | to 100% | 25 | to 100% | to 100% | to 100% | to 100% | to 100% | 19.8 | to 100% |
| MEG | 55 | 55 | 55 | 55 | 55 | 55 | 55 | 55 | 55 | 55 |
| DEA | to pH 7.5 | to pH 7.5 | - | to pH 7.5 | to pH 7.5 | to pH 7.5 | to pH 7.5 | to pH 7.5 | - | to pH 7.5 |
| Propagyl alcohol | - | - | - | - | - | - | 5 | 5 | 5 | 5 |
| Potassium iodide | - | - | - | - | 0.2 | 0.2 | 0.2 | 0.2 | 0.2 | 0.2 |

| mm/yr | 0.502 | 0.668 | 0.000 | 0.215 | 0.207 | 0.186 | 0.375 | 0.463 | 0.005 | 0.123 |
|---|---|---|---|---|---|---|---|---|---|---|
| Fluid appearance Initial | Pale Yellow | Pale Yellow | Amber | Color-less | Color-less | Color-less | Yellow | Yellow | Amber | Yellow |
| Fluid appearance Final | Amber/ Brow | Amber | Amber | Pale Yellow | Yellow | Yellow | Amber/ Brow | Amber/ Brow | Amber | Yellow |
| Coupon Appearance | Tarnish-ed | Tarnish-ed | Un-changed | Tarnish-ed | Tarnish-ed | Tarnish-ed | Tarnish-ed | Tarnish-ed | Un-changed | Tarnish-ed |

Legend: Fail / Pass / Borderline

FIG. 1

| | 11 | 12 | DS-1619 | 13 | 14 | 15 | 16 | 17 | 18 | DS-49023 | EPT-3191 |
|---|---|---|---|---|---|---|---|---|---|---|---|
| | - | - | | - | - | - | - | - | - | | |
| | - | - | | - | - | - | - | - | - | | |
| | - | - | | - | - | - | - | - | - | | |
| | - | - | | 20 | - | - | - | - | - | | |
| | 20 | - | | - | 20 | - | 20 | - | - | | |
| | - | 20 | | - | - | 20 | - | 20 | - | | |
| | - | - | | - | - | - | - | - | 20 | | |
| | to 100% | to 100% | | to 100% | to 100% | to 100% | to 100% | to 100% | to 100% | | |
| | 55 | 55 | | 55 | 55 | 55 | 55 | 55 | 55 | | |
| | to pH 7.5 | to pH 7.5 | | to pH 7.5 | to pH 7.5 | to pH 7.5 | to pH 7.5 | to pH 7.5 | to pH 7.5 | | |
| | 5 | 5 | | 7.5 | 7.5 | 7.5 | 9 | 9 | 9 | | |
| | 0.2 | 0.2 | | 0.2 | 0.2 | 0.2 | 0.2 | 0.2 | 0.2 | | |
| | 0.13 | 0.107 | 0.091 | 0.107 | 0.134 | 0.095 | 0.108 | 0.181 | 0.203 | 0.066 | 1.193 |
| | Yellow | Yellow | Amber | Yellow | Yellow | Yellow | Yellow | Yellow | Yellow | Colour-less | Pale Yellow |
| | Amber | Amber | Amber | Amber* | Amber | Amber | Amber | Amber | Amber | Pale Yellow | Yellow** |
| | Tarnish-ed | Tarnish-ed | Tarnish-ed | Tarnish-ed | Tarnish-ed | Tarnish-ed | Tarnish-ed | Tarnish-ed | Tarnish-ed | Mild Tarnish | Tarnish-ed |

*flakes of solid present
** heavy white precipitate present

FIG. 1 (Continued)

SCALE INHIBITOR COMPOSITIONS AND METHODS OF USING THE SAME

CROSS-REFERENCE TO RELATED APPLICATIONS

This application is a National Stage of International Application No. PCT/US2021/063841, filed Dec. 16, 2021, which claims priority to U.S. Patent Application No. 63/199,299 filed on Dec. 18, 2020, which is herein incorporated by reference in its entirety.

FIELD OF THE DISCLOSURE

Embodiments disclosed herein relate generally to scale inhibitor compositions and methods for inhibiting scale from metal surfaces, in particular, from metal surfaces of industrial and oilfield equipment and/or structures. The scale inhibitor compositions may inhibit scale from the metal surfaces and may comprise at least one scale inhibitor, at least one corrosion inhibitor, at least one neutralizing agent, at least one solvent, or any combinations thereof. The methods disclosed herein may treat subterranean hydrocarbon producing formations with the scale inhibiting compositions by contacting subterranean zones of the formations with the scale inhibiting compositions.

BACKGROUND

The statements in this section merely provide background information related to the present disclosure and do not constitute prior art.

During the production of hydrocarbons from subterranean reservoirs, the downhole environment presents harsh operating conditions for downhole equipment, including high temperatures, caustic chemicals, and constrained spacing. The downhole environment and/or operating conditions can cause impediments such as equipment corrosion and scaling that can damage downhole tools and impact tool function. Downhole scale also may lead to a reduction in productivity or performance due to obstructed flow passages.

Grade F22 alloy is a low alloy steel containing nominally about 2.25% Chromium and widely used in liner and production hangers of sub-sea, deep-water applications due to superior strength and hardness properties. However, commonly used production chemicals have been shown to be very corrosive to Grade F22 alloy, for example, resulting in asset integrity and well safety issues. In addition, sub-sea chemical injection umbilical and capillary lines normally consist of several individual lines bundled together. To prevent the lines becoming damaged, the compatibility of production chemicals with the metallurgy of the injection system is essential. Failure of an injection line due to chemical incompatibility could render an entire umbilical non-functional.

Therefore, developing sub-sea suitable scale inhibitor formulations disclosed herein to prevent mineral scale formation under challenging downhole conditions, while also proving a low risk of corrosion to both metal alloy and commonly used secondary barrier/casing/production tubing sub-sea metallurgies (i.e., weakest components), has been of importance.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one or more embodiments, at least one scale inhibitor composition formulated for treating a subterranean hydrocarbon producing formation and oilfield equipment is provided. The at least one scale inhibitor composition may comprise at least one scale inhibitor, at least one corrosion inhibitor, at least one neutralizing agent, and at least one optional solvent.

In one or more embodiments, a composition for treating a subterranean hydrocarbon producing formation and/or oilfield equipment is provided. The composition comprises a scale inhibitor comprising at least one copolymer, a corrosion inhibitor comprising at least one acid, and a neutralizing agent.

In an embodiment, the at least one copolymer comprises at least one selected from one or more acrylate subunits, one or more vinyl sulphonate subunits, one or more phosphonate end-caps, and at least one combination thereof.

In an embodiment, the scale inhibitor comprises at least one acrylic acid terpolymer.

In an embodiment, the scale inhibitor is at least one selected from maleic acid terpolymer, acrylic acid terpolymer, polyaspartate, phosphino copolymer of acrylic acid, phosphinopolyacrylate, polyphosphono carboxylic acid, vinyl sulphonate copolymer in combination with 2-acrylamido-2-methylpropane sulfonic acid, and at least one combination thereof.

In an embodiment, the at least one acid is phosphoric acid.

In an embodiment, the neutralizing agent is at least one amine-based neutralizing agent selected from diethanolamine, monoethanolamine, or at least one combination thereof.

In an embodiment, the composition further comprises a solvent.

In an embodiment, the solvent comprises at least one selected from a glycol-based solvent, water, or a combination thereof.

In an embodiment, the solvent comprises at least ethylene glycol.

In an embodiment, the scale inhibitor is acrylic acid terpolymer, the corrosion inhibitor is phosphoric acid, and the neutralizing agent is an amine-based neutralizing agent.

In an embodiment, the composition further comprises a solvent selected from a glycol-based solvent, water, or at least one combination thereof.

In one or more embodiment, a method inhibits corrosion of metal surfaces and comprises contacting at least one metal surface with a composition comprising a scale inhibitor comprising at least one copolymer, a corrosion inhibitor comprising at least one acid, and a neutralizing agent.

In an embodiment, the at least one acid of the corrosion inhibitor of the method comprises at least phosphoric acid and the scale inhibitor is one selected from maleic acid terpolymer, acrylic acid terpolymer, polyaspartate, phosphino copolymer of acrylic acid, phosphinopolyacrylate, polyphosphono carboxylic acid, vinyl sulphonate copolymer in combination with 2-acrylamido-2-methylpropane sulfonic acid, and at least one combination thereof.

In an embodiment, the neutralizing agent of the method is an amine-based neutralizing agent.

In an embodiment, the amine-based neutralizing agent of the method is at least one selected from diethanolamine, monoethanolamine, or at least one combination thereof.

In an embodiment, the composition of the method further comprises a solvent selected from a glycol-based solvent, water, or at least one combination thereof.

In one or more embodiments, a method treats a subterranean hydrocarbon producing formation with corrosion inhibiting composition and comprises contacting a subterranean zone of the subterranean hydrocarbon producing formation with a composition such that a corrosive effect of an acidizing composition on metal surfaces in contact therewith are reduced The composition of the method comprises a scale inhibitor comprising at least one copolymer, a corrosion inhibitor comprising at least one acid, and an amine-based neutralizing agent.

In an embodiment, the scale inhibitor of the method is one selected from maleic acid terpolymer, acrylic acid terpolymer, polyaspartate, phosphino copolymer of acrylic acid, phosphinopolyacrylate, polyphosphono carboxylic acid, vinyl sulphonate copolymer in combination with 2-acrylamido-2-methylpropane sulfonic acid, and at least one combination thereof.

In an embodiment, the at least one acid of the method comprises at least phosphoric acid and the amine-based neutralizing agent is at least one selected from diethanolamine, monoethanolamine, or at least one combination thereof.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 1 shows a table containing Grade 22 alloy compatibility data for a plurality of scale inhibitor compositions disclosed herein, according to one or more examples of the disclosure.

DETAILED DESCRIPTION

Figure 2:
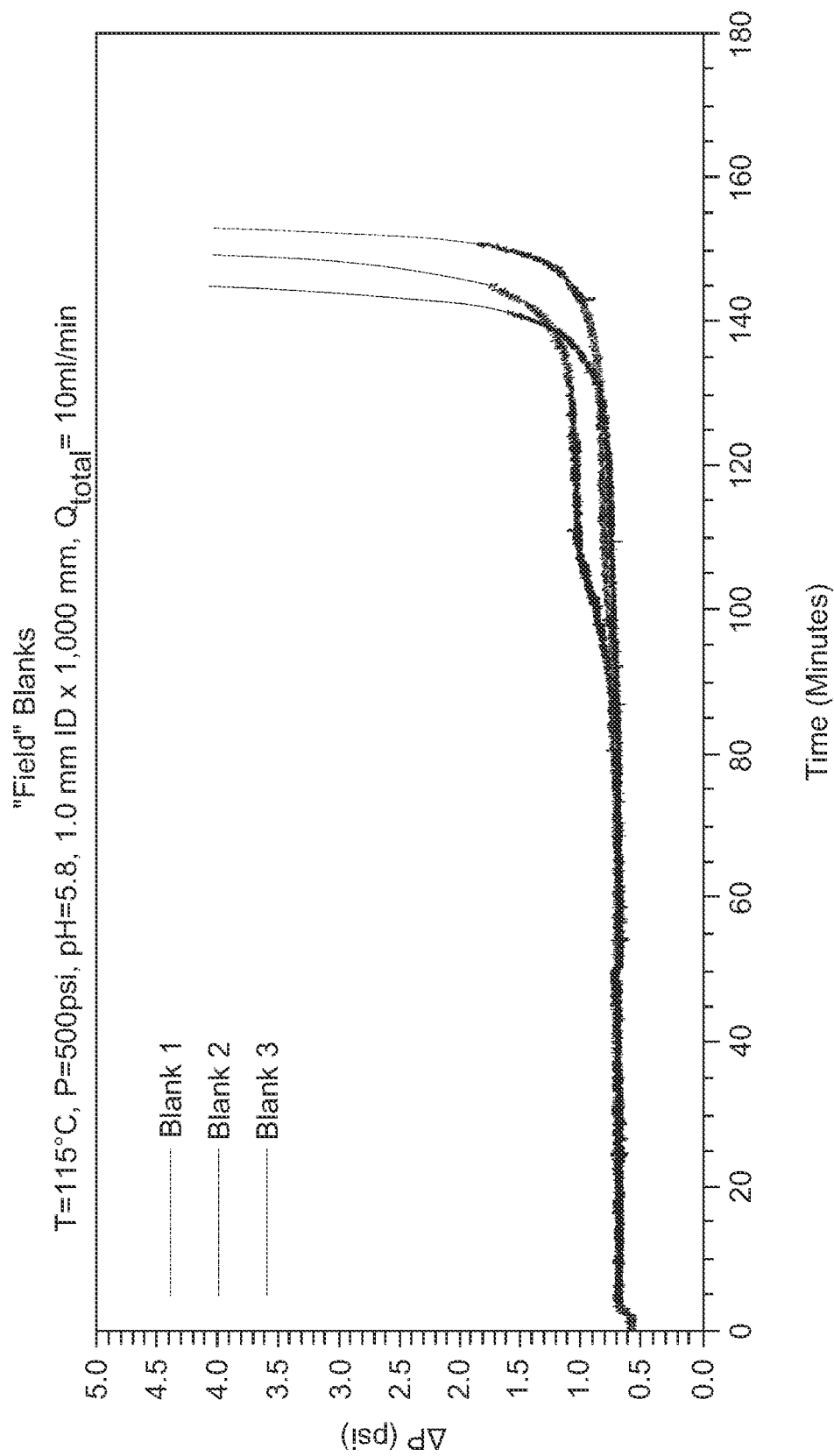
FIG. 2 is a graph illustrating an overlay of Dynamic Scaling Loop (hereinafter "DSL") blank scaling assessment, according to one or more examples of the disclosure.
Figure 3:
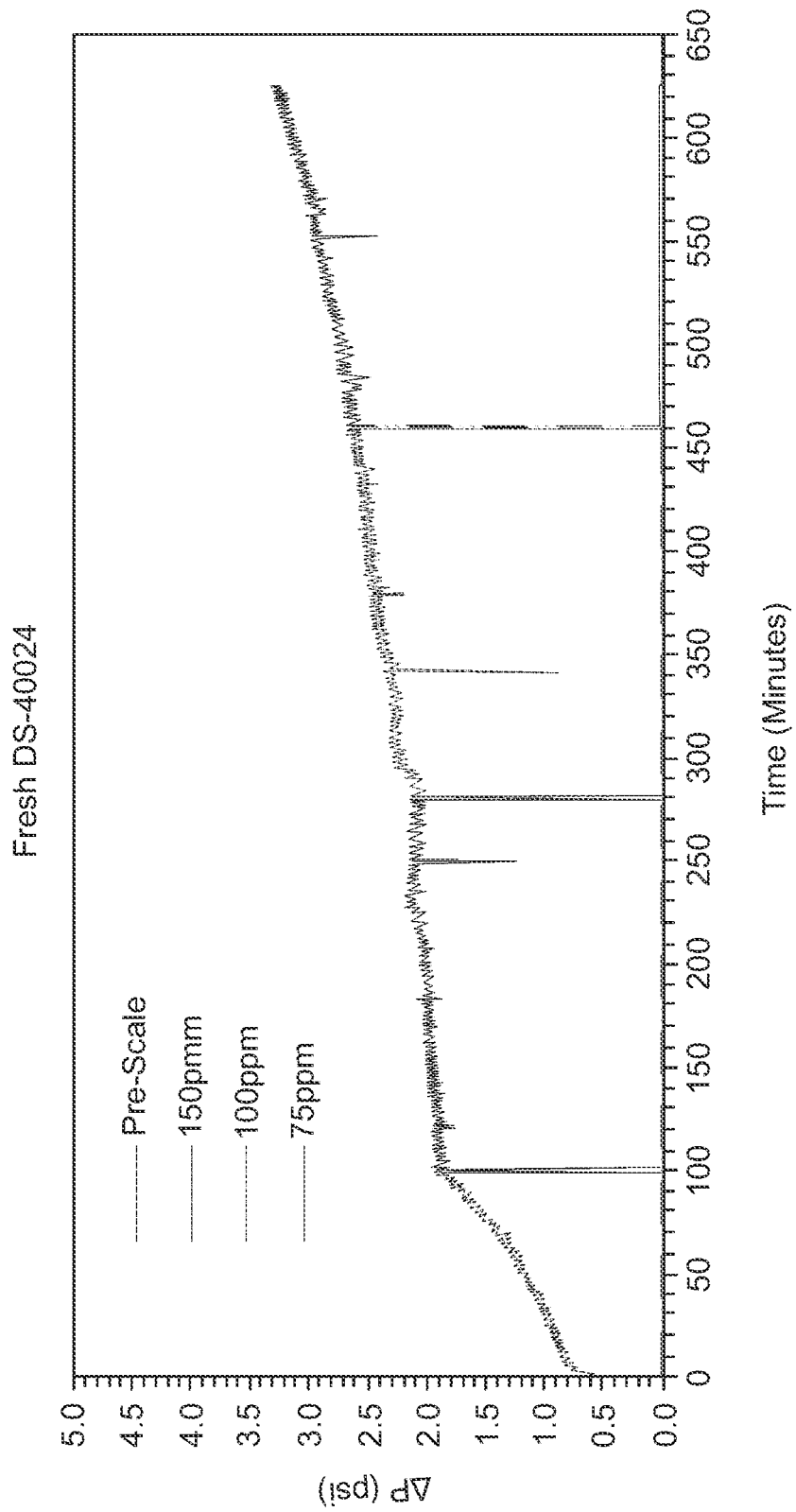
FIG. 3 is a graph illustrating an initial DSL evaluation of a scale inhibitor composition disclosed herein, according to one or more examples of the disclosure.
Figure 4:
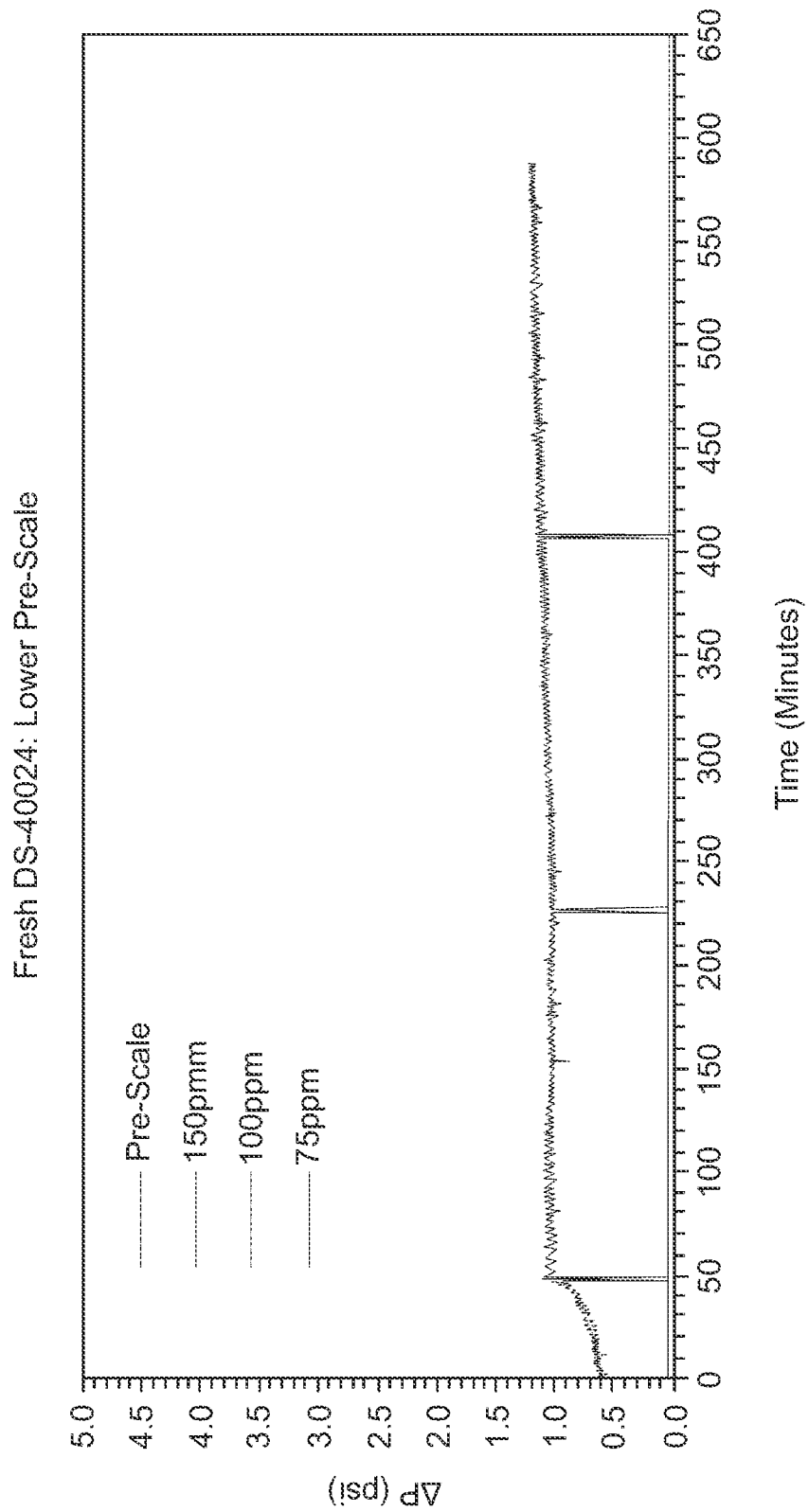
FIG. 4 is a graph illustrating a repeated DSL evaluation of a scale inhibitor composition disclosed herein with a lower pre-scale, according to one or more examples of the disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Also, the phrases "selected from the group consisting of," "chosen from," and the like include mixtures of the specified materials. Terms, such as, for example, "contains" and the like are meant to include "including at least" unless otherwise specifically noted.

Herein, the term "about" when applied to a value generally means within the tolerance range of the equipment used to produce the value, or in some examples, means plus or minus 10%, or plus or minus 5%, or plus or minus 3%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation. Where a numerical limit or range is stated herein, the endpoints are included. Also, all values and subranges within a numerical limit or range are specifically included as if explicitly written out.

The present disclosure generally relates to at least a scale inhibitor formulation or composition (hereinafter "the scale inhibitor composition") and at least one method for inhibiting scale from metal surface, such as, metal surfaces of industrial and/or oilfield equipment and/or structures (hereinafter "equipment/structures"). The scale inhibitor compositions and methods disclosed herein may be utilized to mitigate or reduce one or more corrosion and/or performance issues/problems associated with the industrial and/or oilfield equipment/structures. The scale inhibitor compositions and methods disclosed herein may be applied to a crude oil medium associated with the industrial and/or oilfield equipment/structures. To effectively mitigate or reduce the one or more issues/problems associated with the industrial and/or oilfield equipment/structures, the scale inhibitor compositions may function in the crude oil medium and may be compatible with the crude oil medium.

In some embodiments, the applications of the scale inhibitor compositions disclosed herein may comprise, but are not limited to, at least one application selected from scale inhibition, corrosion inhibition, wax inhibition, asphaltene inhibition, pour point depressant, demulsifiers, or any combinations thereof. The scale inhibitor compositions may comprise at least one chemical useful in the production and/or transportation of crude oil and other petroleum products. In other embodiments, the scale inhibitor compositions may be useful in exploration and development and/or during drainage of hydrocarbons from an oil or gas field. The hydrocarbons may be complex mixtures that may be in the form of crude oils, bitumen, asphalts, or any mixtures thereof. In further embodiments, the scale inhibitor compositions may comprise at least one chemical, compound, and/or component selected from the group consisting of at least one scale inhibitor, at least one corrosion inhibitor, at least one neutralizing agent, at least one solvent, at least one amine, at least one demulsifier, at least one gas hydrate inhibitor, at least one biocide/bactericide, at least one defoamer, at least one wax/paraffin inhibitor, at least one asphaltenes dispersant, at least one pour point depressant, at least one anti-agglomerant, at least one hydrogen sulfide scavenger, or any combinations thereof.

For purposes herein, the scale inhibitor compositions disclosed herein may be applied to, added to, introduced into or mixed into one or more oil-based fluids or one or more aqueous-based fluids for delivery into one or more subterranean zones of subterranean hydrocarbon producing formations. Oil-based fluids may refer to any fluid which comprises a hydrocarbon and/or may include crude oil, crude oil condensate, and/or various streams which may be produced during extraction of hydrocarbons from oil and/or gas wells. Also included are refined streams including various fuel oils, diesel fuel, kerosene, gasoline, one or more combinations thereof, and/or the like. Aqueous-based fluids disclosed herein may include tap water, produced water from a reservoir, sea water, brines, one or more combinations thereof, and/or the like. Further, it is envisioned that aqueous-based fluids may include at least some water miscible compounds, such as, for example, alcohols and/or the like.

The scale inhibitor compositions disclosed herein are compatible with one or more alloy metals. The methods disclosed herein may inhibit scale on one or more metal surfaces by contacting the one or more metal surfaces with the scale inhibitor composition that are compatible with one or more alloy metals. In some embodiments, the methods disclosed herein may treat subterranean hydrocarbon producing formations with the scale inhibiting compositions by contacting subterranean zones with the scale inhibitor compositions that are compatible with one or more alloy metals. In embodiments, the one or more alloy metal may be, but is not limited to, Grade F22 alloy.

In one or more embodiments, the scale inhibitor compositions disclosed herein comprise at least one scale inhibitor, at least one corrosion inhibitor, at least one neutralizing agent, at least one optional solvent, or any combinations thereof. A majority or substantial majority of the scale inhibition composition may include the at least one optional solvent. In some embodiments, a total amount of the at least one scale inhibitor may be less than or about equal to a total amount of the at least one solvent and/or greater than or about equal to a total amount of the at least one corrosion inhibitor or the at least one neutralizing agent. In other embodiments, a ratio of the at least one scale inhibitor to the at least one solvent may range from about 1:1 to about 1:4, from about 1:1 to about 1:3, or from about 1:1 to about 1:2.

The at least one scale inhibitor of the scale inhibition compositions disclosed herein are usable to control and/or prevent scale deposition in, for example, but not limited to, at least one production conduit and/or completion system. The scale inhibitor composition may be continuously injected through a downhole injection point in the completion, or may be one or more periodic squeeze treatments that may be undertaken to place the at least one scale inhibitor in a reservoir matrix for subsequent commingling with fluids, such as, but not limited to, produced fluids. In some embodiments, the scale inhibitor compositions may integrate the at least one scale inhibitor and one or more fracture treatments into one step for treating an entire well with the at least one scale inhibitor disclosed herein. In said treatment, the at least one scale inhibitor may be pumped into a matrix surrounding at least one fracture face during at least one leakoff, wherein it may be adsorbed to the matrix during pumping until a fracture begins to produce water. As water passes through the inhibitor-adsorbed zone, the water may dissolve a sufficient amount of the at least one scale inhibitor to prevent scale deposition. As a result, the at least one scale inhibitor may be better placed than in a conventional scale-inhibitor squeeze, which may reduce retreatment costs and/or may improve overall production.

In some embodiments, the at least one scale inhibitor disclosed herein may comprise at least one robust scale inhibitor that may exhibit improved and excellent thermal stability, excellent brine tolerance, high calcium tolerance, and/or good iron tolerance. The at least one scale inhibitor may function with excellent efficiently against more than one scale type at substantially neutral pH values, such as, but not limited to, from about 5.5 to about 9.5, from about 6.0 to about 8.5, from about 6.5 to about 7.5, from about 6.8 to about 7.5, or from about 7.0 to about 7.5. In embodiments, the more than one scale type may comprise, but is not limited to, carbonate, sulphate, ZnS and/or PbS scales or any combinations thereof. The at least one scale inhibitor may be efficiently utilized in high temperature and/or high-pressure systems, wherein system temperatures may be greater than about 150° C., greater than about 180° C., or greater than about 200° C. However, the at least one scale inhibitor may also be efficiently utilized in lower temperature systems having temperature below about 200° C., below about 150° C., or below about 100° C.

The at least one scale inhibitor disclosed herein may be present in the scale inhibition composition at a concentration of greater than about 20 wt. %, greater than about 25 wt. %, greater than about 30 wt. %, greater than about 35 wt. %, greater than about 40 wt. %, or greater than about 45 wt. %. In some embodiments, the concentration of the at least one scale inhibitor may be less than about 50 wt. %, less than about 45 wt. %, less than about 40 wt. %, less than about 35 wt. %, less than about 30 wt. %, less than about 25 wt. %, less than about 20 wt. %. All weight percentages of the at least one scale inhibitor is calculated to a total weight of the scale inhibition composition. In other embodiments, the concentration of the at least one scale inhibitor may be greater than about 10 mg/I, greater than about 20 mg/I, greater than about 50 mg/I, greater than about 100 mg/I, greater than about 500 mg/I, greater than about 1500 mg/I, or greater than about 2000 mg/I and/or less than about 2500 mg/I, less than about 2000 mg/I, less than about 1500 mg/I, less than about 1000 mg/I, less than about 500 mg/I, less than about 100 mg/I, less than about 50 mg/I, or less than about 30 mg/I. In still other embodiments, the at least one scale inhibitor may be present at a concentration of at least about 2.5 ppm, at least about 5 ppm, at least about 10 ppm, at least about 25 ppm, at least about 50 ppm, or at least about 100 ppm and/or less than about 150 ppm, less than about 100 ppm, less than about 50 ppm, less than about 25 ppm, or less than about 10 ppm.

In one or more embodiments, the at least one scale inhibitor disclosed herein may be in the form of an aqueous polymer solution. The aqueous polymer solution may comprise one or more polymers which may be one or more synthetic polymers. In an embodiment, the one or more polymers may be, for example, but not limited to, one or more block polymers. In some embodiments, the at least one scale inhibitor disclosed herein may comprise at least one selected from at least one polyamide (i.e., polyaspartate or polyaspartamide), at least one polyamidoamine, at least one polyethyleneimine, at least one polyetthyloxazoline, at least one polyphosphate, one or more polyacrylates or copolymers thereof, one or more polymethacrylates, at least one polyamine base or a combination of 1-hydroxy ethane-1,1-diphosphonates, organophosphoric acid (i.e., diethylenetriamine penta(methylene phosphonic acid), nitrilo(methylene phosphonic acid), and/or hydroxyethylidene diphosphonic acid), at least one methacrylic diphosphonate homopolymer, one or more polymaleates, one or more phosphate esters, at least one acrylic acid-allyl ethanolamine diphosphonate copolymer, at least one sodium vinyl sulfonate-acrylic acid-allyl ammonia diphosphonate terpolymer, at least one acrylic acid-maleic acid-diethylene triamine, at least one allyl phosphonate terpolymer, at least one poly-maleic acid, one or more polycarboxylates, one or more polysaccharide-based polycarboxylates, one or more carboxymethyl inulin biopolymers, one or more cationic inulin, starch based biopolymers, at least one sulfonated polyacrylic acid copolymer or any combinations thereof.

The at least one scale inhibitor itself may have a pH value ranging from about 1.5 to about 4.5, from about 1.8 to about 4.2, or from about 2.0 to about 4.0. Further, the at least one scale inhibitor disclosed herein may have a density or relative density from about 1.0 to about 1.3 $g/cm^3$, from about 1.1 to about 1.25 $g/cm^3$, from about 1.125 to about 1.17 $g/cm^3$, or about 1.14 $g/cm^3$. Still further, the at least one scale inhibitor may have Mw values ranging from about 4000 to about 7000, from about 4500 to about 6500, or from about 5000 to about 6000. Moreover, the at least one scale inhibitor may comprise at least one copolymer containing phosphonic groups, sulphonic groups, carboxylic acid groups, or any combinations thereof. In some embodiments, the at least one scale inhibitor may comprise two or more of the scale inhibitors disclosed herein. In some embodiments, the at least one scale inhibitor may be used in combination with at least one hydrogen sulfide scavenger. For example, the at least one scale inhibitor may be used in combination with, but not limited to, at least one triazine-based H2S scavenger.

In some embodiments, the at least one copolymer of the at least one scale inhibitor disclosed herein may comprise one or more acrylate subunits, one or more vinyl sulphonate subunits, at least one phosphonate end-cap, or any combinations thereof. In an embodiment, the subunits of the at least one copolymer may have a semi-random distribution throughout the copolymer. For example, the at least one scale inhibitor may be, but is not limited to, acrylic acid terpolymers having the following chemical structure:

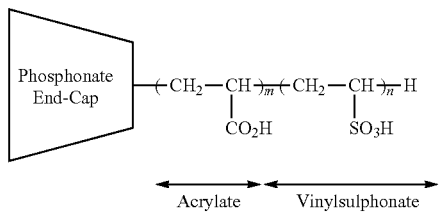

In other embodiments, the at least one scale inhibitor disclosed herein may be for example, but not limited to, at least one polycarboxylic terpolymer, at least one polymerized amino acid, at least one protein-like polymer or copolymers, at least one biodegradable biopolymer, one or more acrylic acid polymers, one or more maleic acid polymers, one or more phosphonates, at least one acidic monomer, or any combinations thereof. For example, the at least one scale inhibitor may be, but is not limited to, at least one maleic acid terpolymer, at least one acrylic acid, 2-acrylamido-2-methylpropane sulfonic acid terpolymer, at least one acrylic acid, 2-acrylamido-2-methylpropane sulfonic acid, hydroxypropyl acrylate terpolymer, at least polyaspartate, phosphino copolymer of acrylic acid, one or more phosphinopolyacrylates, at least one polyphosphono carboxylic acid, at least one vinyl sulphonate copolymer, 2-acrylamido-2-methylpropane sulfonic acid, or any combinations thereof.

In one or more embodiments, the at least one corrosion inhibitor of the scale inhibitor compositions disclosed herein may comprise one or more acids, such as, but not limited to, at least one weak acid. In at least one embodiment, the at least one corrosion inhibitor disclosed herein may be in the form of an aqueous solution and the one or more acids may be present at a concentration volume of at least about 75%, at least about 80%, at least about 85%, or at least about 90% of the total volume of the aqueous solution. At least one of temperature controls and/or cooling means may be required and/or utilized as the at least one corrosion inhibitor disclosed herein may be added to or mixed into the scale inhibitor compositions.

In some embodiments, the present at least one corrosion inhibitor may comprise two or more corrosion inhibitors disclosed herein. The at least one corrosion inhibitor may also function as a neutralizing agent in some embodiments disclosed herein. In some embodiments, the at least one corrosion inhibitor may be, but is not limited to, one or more amine-based corrosion inhibitors, one or more orthophosphate-based corrosion inhibitors, one or more antiseptic-based corrosion inhibitors, or any combinations thereof. For example, the at least one corrosion inhibitor may be, but is not limited to, phosphoric acid, benzalkonium chloride, at least one amine-based corrosion inhibitor, or any combinations thereof. In other embodiments, the at least one corrosion inhibitor may be organic, inorganic, or a combination thereof. Non-limiting examples of the at least one corrosion inhibitor may include one or more phosphates, one or more silicates, one or more borates, one or more zinc compounds, one or more organic amines (i.e., quaternary nitrogen compounds as commonly referred to as "quats"), one or more betaines, benzoic acid, one or more benzoic acid derivatives (i.e., sodium benzoate), one or more phosphate esters, one or more heterocyclic nitrogen and sulfur compounds (i.e., benzotriazole), one or more organic acids, one or more imidazolines, one or more phosphate esters, one or more ester quats, or any combinations thereof.

In one or more embodiments, the at least one neutralizing agent of the scale inhibitor composition disclosed herein may comprise, but is not limited to, at least one amine, one or more other organic compounds, or a combination thereof. For example, the at least one neutralizing agent may be, but is not limited to, monoethanolamine (hereinafter "MEA"), diethanolamine (hereinafter "DEA"), other amine-based neutralizing compounds, other organic neutralizing compounds, or any combinations thereof. In some embodiment, the present at least one neutralizing agent comprises two or more of the neutralizing agents disclosed herein. At least one of temperature controls and/or cooling means may be required or utilized as the at least one neutralizing agent is added to or mixed into the scale inhibitor compositions.

The at least one optional solvent of the scale inhibitor composition disclosed herein may comprise water, other organic compounds, or a combination thereof. For example, the scale inhibitor composition may include at least one solvent which may be selected from, but is not limited to, water, glycol-based solvent, or a combination thereof. In at least one embodiment, the at least one solvent comprises, but is not limited to, water, ethylene glycol, or a combination thereof. In some embodiments, the present at least one solvent may comprise two or more solvents disclosed herein. The at least one solvent may be present at concentrations ranging from more than about 5 wt. % to less than about 95 wt. %, from more than about 15 wt. % to less than about 80 wt. %, from more than about 30 wt. % to less than about 70 wt. %, from more than 40 wt. % to less than about 65 wt. %, or from about 50 wt. % to less than about 60 wt. %, wherein all weight percentages are calculated to the total weight of the scale inhibitor compositions. In at least one embodiment, the balance of the scale inhibitor compositions, excluding the at least one scale inhibitor, the at least one corrosion inhibitor, and/or the at least one neutralizing agent, may comprise or consist of the at least one solvent.

In one or more embodiments, the scale inhibitor compositions may further comprise at least one alcohol-based organic compound. The at least one alcohol-based organic compound may function or be utilized as at least one of a solvent stabilizer, a metal complex solution, an additional corrosion inhibitor, or any combinations thereof. For example, the at least one alcohol organic compound may be, but is not limited to, alcohol compound containing at least one alkyne functional group. In an embodiment, the at least one alcohol organic compound may be, but not limited to, propargyl alcohol. The at least one alcohol-based organic compound may be present at concentrations ranging from about 0.1 wt. % to about 20 wt. %, from about 1 wt. % to about 17.5 wt. %, from about 2 wt. % to about 15 wt. %, from about 5 wt. % to about 10 wt. %, or from about 7.5 wt. % to about 9 wt. %, wherein weight percentages are based on the total weight of the scale inhibitor compositions.

Examples

Inventive Examples 1 and 2 are directed to scale inhibitor compositions in accordance with the embodiments disclosed herein, wherein the scale inhibitor compositions comprises composition components at component concentrations set forth in Tables 1 and 2. The scale inhibitor compositions of Inventive Examples 1 and 2 comprise an acrylic acid terpolymer as the at least one scale inhibitor which functions efficiently as a robust scale inhibitor against multiple scale types at about neutral pH and having excellent thermal stability, excellent high calcium, and good iron tolerance.

TABLE 1

| Inventive Example 1 | | |
| --- | --- | --- |
| Raw Material | Wt. % | Type |
| Ethylene Glycol (MEG) | 55.0 | Solvent |
| Acrylic Acid Terpolymer | 36.5 | Scale inhibitor |
| DEA | 6.5 | Neutralizing agent |
| Phosphoric Acid (85%) | 2.0 | Neutralizing agent |

TABLE 2

| Inventive Example 2 | | |
| --- | --- | --- |
| Raw Material | Wt % | Type |
| Ethylene Glycol (MEG) | 45.5 | Solvent |
| Acrylic Acid Terpolymer | 46 | Scale inhibitor |
| DEA | 6.5 | Neutralizing agent |
| Phosphoric Acid (85%) | 2.0 | Neutralizing agent |

As further described hereinafter, superior corrosion data was obtained during testing for Inventive Example 1 with respect to at least Grade C1018 (low carbon steel) and Grade 13Cr (martensitic stainless steel) under high temperature conditions up to 170° C., without degradation of performance of the at least one scale inhibitor of Inventive Example 1. Inventive Example 1 also achieved superior corrosion data with respect to Grade F22 alloy from 54° C. to 121° C., while efficiently functioning against a variety of scale types (i.e., carbonates and sulphates) in the presence of iron, which is known to "poison" the functionality of many scale inhibitors, and high calcium concentration, which commonly causes fluid-chemical incompatibility at high temperatures.

Inventive Examples 1 and 2 utilize phosphoric acid as the at least one corrosion inhibitor of the scale inhibitor compositions. Although several mechanisms may be proposed, excellent passivation may be provided by formation of iron phosphate type of crystals on the metal surface(s). Said passivation is support by data set forth hereinafter showing that corrosion of Grade F22 alloy reduces with increasing temperature, which suggests that kinetics of P-mineral formation are faster; therefore, resulting in rapid passivating of the metal surface(s) and a reduction in corrosion and/or pitting.

Inventive Examples 1 and 2 also utilize an amine as the at least one neutralisation agent of the scale inhibitor compositions, which may additionally act as a corrosion inhibition aid.

Supported by tests further discussed hereinafter, Inventive Example 1 achieves an excellent corrosion rate, when used against Grade F22 alloy, of less than 4 mils per year (hereinafter "mpy") at high and low temperatures over 7-days, 14-days, and 28-days. Additionally, Inventive Example 1 achieved good/acceptable performances under challenging downhole conditions with respect to Grade F22 alloy.

The table set forth in FIG. 1 presents Grade F22 alloy compatibility data at 70° C. over 7-days for a plurality of scale inhibitor compositions in accordance with the embodiments disclosed herein. The scale inhibitor compositions shown in FIG. 1 comprise scale inhibitors in combination with corrosion inhibitors and standalone, finished products, both of which are in accordance with the embodiments disclosed herein. Some of the scale inhibitor compositions shown in FIG. 1 were too close/borderline to the set corrosion limit, thermally unstable and/or non-performing under challenging field conditions. For example, some scale inhibitor compositions did not pass the Grade F22 alloy corrosion limits when combined with a different corrosion inhibitor package, some scale inhibitor compositions showed good results against Grade F22 alloy but were very thermally unstable and only suitable for long term exposure to temperatures of <70° C., limiting its applicability, and/or some scale inhibitor compositions showed promising initial results but did not provide suitable performance under field conditions.

The scale inhibitor compositions of Inventive Examples 1 and 2 and/or those scale inhibitor compositions set forth in FIG. 1 may alternatively comprise one or more different neutralizing agents than DEA, such as, but not limited to, MEA, one or more different acids than the phosphoric acid, one or more different solvents, or any combinations thereof.

Performance testing disclosed hereinafter was completed with respect to Inventive Example 1. The performance testing disclosed herein fluid comprises compatibility test results, DSL test results, and Grade F22 alloy compatibility testing for Inventive Example 1.

Blank scale testing was conducted in triplicate following the known testing guidelines for evaluating the blank scale time. The performance testing was evaluated under the following operational conditions: a temperature of 115° C.; a pressure of 500 psi; and the brine was buffered with sodium acetate/acetic acid followed by adjusting the pH to 5.8 for the resulting test brine.

Grade F22 alloy compatibility testing was performed in triplicate at both 54 & 121° C. for a total of 28-days. Additional Grade F22 alloy compatibility tests were performed for 7-days, using the Post-DeepWater Flow Loop aged sample of Inventive Example 1. Further, additional Dynamic Scale Loop (DSL) tests were also performed under modified protocols.

Fluid compatibility testing was conducted on Inventive Example 1 using "Field" brine at 90° C. Inventive Example 1 was compatible across the full range of concentrations tested.

Initial proof of concept blank scaling tests were conducted. The averaged blank scaling time for the "Field" brine was determined to be about 145 minutes under the provided conditions.

For initial performance testing by DSL, the "Field" brine was first allowed to pre-scale for 100 minutes followed by application of the scale inhibitor composition disclosed herein at reducing concentrations of 150 ppm, 100 ppm, and 75 ppm. Each concentration was held for 180 minutes. Inventive Example 1 was under the threshold of <1 psi increase at each concentration, though scale was clearly forming at 100 ppm and 75 ppm. However, it was noted that for Inventive Example 1, the initial pre-scale conditions were harsher than compared with other screened scale inhibitors. Therefore, Inventive Example 1 was rerun, stopping the pre-scale at about 1 psi, regardless of the time taken to reach this pressure. Under such conditions, Inventive Example 1 performed considerably better.

Subsequently, Inventive Example 1 was tested against Grade F22 alloy. Inventive Example 1 showed excellent Grade F22 alloy compatibility with <1 mpy at all tested temperatures and time steps.

However, it was noted that there was a viscosity change after the High-Pressure Flow Loop Test (whereby neat Inventive Example 1 was continuously circulated in the flow loop for a period of 72-hours at 4000 psi, exposing the scale inhibitor composition disclosed herein to temperature cycles of 4° C. to 100° C. Given the loop has a volume of around 100 ml, approximately 216 cycles are obtained over 72-hours). Additionally, the post-DeepWater Flow Loop "aged" sample of Inventive Example 1 was used in both an additional DSL Test and 7-day Grade F-22 alloy compatibility test. The results indicated that there was a reduction in performance by DSL. Scale was forming at all concentrations, although both 150 ppm and 100 ppm were within the pass criteria of the test (i.e., <1 psi for 3-hours), although 100 ppm was borderline. However, as described above, the Flow Loop test is extremely harsh with respect to temperature cycles, whereas in the field it is typically only a single cold-*hot-*cold cycle. Regarding Grade F22 alloy compatibility, repeat testing on aged Inventive Example 1 again showed excellent results.

Subsequently, additional requested DSL tests on the post-DeepWater Flow Loop aged sample were performed using the following protocols: DSL with the starting dose rate of 75 ppm, repeating the same pre-scale criteria of 1 psi, followed by 3-hrs of testing; and DSL with the starting dose rate of 100 ppm, repeating the same pre-scale criteria of 1 psi, followed by 3 h-rs of testing.

These tests were requested as it was judged that under the initial protocols, if scale was forming at a higher dosage but passed the <1 psi criteria, then the conditions under which the subsequent lower dosage was exposed to were more severe (i.e., the amount of pre-scale+scale which had formed at the previous dose).

Under the conditions described, 75 ppm failed towards the end of the 3-hour pass period but performed better than under the original protocols, whereby scale was initially controlled for 35-minutes. The test was then repeated using 100 ppm. The onset of scaling was delayed for 45-minutes after which scaling occurred. However, at the end of the 3-hour pass time, the increase in $\Delta P$ was on under limit of the pass criteria, showing improved performance compared with results using the original protocols.

Based on the performed DSL, the practical working MIC of Inventive Example 1 is 100 ppm under "Field" conditions.

The fluid compatibility test evaluates the compatibility of the scale inhibitors disclosed herein with the production or well water to highlight potential issues when introduced into an oilfield system.

The fluid compatibility test was used to confirm the compatibility of Inventive Example 1 with the calcium content of the "Field" brine. The provided brine composition was utilized, and a synthetic brine was prepared and utilized to conduct the fluid compatibility tests at 90° C. for a 24-hour duration with observations taken at initial, 1-hour, 4-hours, and 24-hours. The formulated product was injected into the brine at five concentrations (i.e., 100 ppm, 150 ppm, 250 ppm, 500 ppm, and 1,000 ppm). The samples were then held at 90° C. for a period of 24-hours. Observations were made before and after for any evidence of incompatibility such as precipitation, flocculation, emulsification, and/or destabilization. Therefore, the test parameters for the fluid compatibility test were: "field" brine; fluid ratios of 100 ppm, 150 ppm, 250 ppm, 500 ppm, and 1,000 ppm; and a temperature of 90° C.

TABLE 3

"Field" Brine Composition for Compatibility Tests

| Ion | "Field" Compatibility Brine |
|---|---|
| $Na^+$ | 45750 |
| K+ | 347 |
| $Mg^{2+}$ | 554 |
| $Ca^{2+}$ | 4491 |
| $Sr^{2+}$ | 700 |
| $Ba^{2+}$ | 72 |
| $Fe^{2+}$ | 0 |
| $HCO3^-$ | 0 |
| $SO4^-$ | 0 |
| $Cl^-$ | 79500 |
| pH | 5.8 |

Note: Sulphate, Bicarbonate and Iron were Eliminated from Compatibility Test to Prevent False Incompatibilities Due to Scaling and Oxidation A dynamic scaling loop (DSL) test indicates a minimum effective dosage (hereinafter "MED") required to prevent scaling under a given set of test conditions, by observation of the speed at which a narrow bore tube blocks when a scaling brine is passed through it. In order to achieve controlled scaling, the scaling test brine composition is calculated out into two non-scaling brines (i.e., one containing the scaling cations and the other the scaling anions), such that when the two are mixed together in a 50:50 ratio the resulting fluid has the required scaling composition. The DSL test is then set up to mix the two brines at the entry point to the tube.

Cation and anion brines were prepared as above to investigate the scaling potential of "Field" brine. The brines were pumped separately into the rig at the temperature, pressure and flow rates given, with the brines mixing at the entry point to a narrow-coiled tube, and reproducing the fluid mixture with the potential to form scale as it enters the coil. The scale build-up in the coil was monitored via the differential pressure change across the coil, with the time taken for the differential pressure to reach a certain level being recorded as the baseline scaling time. A scale inhibitor was then added to the brine to inhibit the formation of scale and the test repeated; the efficacy of the inhibitor being judged by how much longer it took to reach the same differential pressure across the coil. Scale inhibitors were selected for testing in accordance with the given criteria for this predetermined application.

The following test parameters were utilized during the testing: brine "field"; temperature of 115° C.; pressure of 500 psi; flow rate total of 10 mL/min (i.e., 5 mL/min from each pump); mixing coil of 1.0 mm ID×1,000 mm length, stainless (316) steel; scaling criterion of observed differential pressure increase of 1 psi from baseline value; and MED Pass criterion for each concentration to continue for 3 hours with <1 psi increase in pressure.

The following water chemistry was utilized for the testing:

TABLE 4

"Field" Brine Composition for DSL Tests

| Ion | "Field" DSL Brine |
| --- | --- |
| $Na^+$ | 45750 |
| K+ | 347 |
| $Mg^{2+}$ | 554 |
| $Ca^{2+}$ | 4491 |
| $Sr^{2+}$ | 700 |
| $Ba^{2+}$ | 72 |
| $Fe^{2+}$ | 23 |
| $HCO3^-$ | 300 |
| $SO4^-$ | 34 |
| $Cl^-$ | 79500 |
| pH | 5.8 |

The following tests evaluated the compatibility of Inventive Example 1 with Grade F22 alloy.

All coupons were cleaned before the test was started, using a clean nylon brush and acetone and left to air dry. Clean nitrile gloves were always worn when handling corrosion coupons. The coupons were weighed the coupon to 4 decimal places and dimensions measured using calipers. The coupons were placed into the test container (a Schott bottle or as identified in the laboratory request/procedure). An appropriate volume of the test fluid (typically a minimum of 6.5 ml of test solution for every $cm^2$ of surface area of coupon) was used; however, the coupon must be fully submerged in the fluid so the volume should be larger if required. The same surface area/fluid volume ratio was used for all coupons being tested in a comparative test. An air headspace was left in the test container to allow for pressure variations. The coupons were incubated at the required test temperature for the required test duration. After 7-days, the coupons were removed with tweezers and rinsed with acetone, allowed to air dry and examined for blisters or visible evidence of corrosion, weighed and photographed. The samples then re-immersed in the same solutions and left for a further 7-days (i.e., 14-days total), removed and analyzed as before. The process was then repeated for a further 14-days (i.e., 28-days total). After a total of 28-days, the coupons were treated with an inhibited HCl solution (Super Clarke's solution) for maximum 10-minutes to remove other corrosion debris or adherent scales. Finally, the coupons were washed with acetone, left to air dry and then weighed to four decimal places. The surfaces were then re-examined under a microscope for evidence of pitting and photographed.

The following test parameters were utilized: coupon of Grade F22 alloy; a replication of triplicate; temperatures at 54 and 121° C.; and a duration of 28-days total.

The brine compatibility results show that the Inventive Composition was compatible with "Field" brine at chemical concentrations of 100 ppm, 150 ppm, 250 ppm, 500 ppm, and 1,000 ppm. All compatibility tests were conducted at 90° C. Iron and scaling anions (i.e., sulphate and bicarbonate) were removed from the test brine for compatibility tests. Visual observations were made initially and then after 1-hour, 4-hours, and final observations were made after 24-hours.

TABLE 5

Brine Compatibility Test Results for Inventive Example 1

| | Concentration of Inventive Example 1 | | | | |
| --- | --- | --- | --- | --- | --- |
| Time | 100 ppm | 150 ppm | 250 ppm | 500 ppm | 1000 ppm |
| 0 Hr | Clear | Clear | Clear | Clear | Clear |
| 1 Hr | Clear | Clear | Clear | Clear | Clear |
| 4 Hr | Clear | Clear | Clear | Clear | Clear |
| 24 Hr | Clear | Clear | Clear | Clear | Clear |

Proof of concept blank scaling tests were conducted. For DSL testing, the averaged blank scaling time for the "Field" brine was determined to be about 145-minutes under the predetermined conditions.

For initial performance testing of the Inventive Example 1, the "Field" brine was first allowed to pre-scale for 100 minutes followed by application of the Inventive Example 1 at concentrations of 150 ppm, 100 ppm, and 75 ppm. Each concentration was held for 180-minutes. Inventive Example 1 was under the threshold of <1 psi increase at each concentration, though scale was clearly forming at 100 ppm and 75 ppm. However, it was noted that for Inventive Example 1, the initial pre-scale conditions were harsher compared with other products initially screened for this application. Therefore, a re-run Inventive Example 1 and stopping the pre-scale at about 1 psi was performed, regardless of the time taken to reach this pressure. Under said conditions, Inventive Example 1 performed considerably better.

For Post-DeepWater Flow Loop Sample of Inventive Example 1, it was noted that there was a viscosity change in Inventive Example 1 after the High-Pressure Flow Loop Test (whereby neat Inventive Example 1 was continuously circulated in the flow loop for a period of 72-hours at 4000 psi, exposing the chemical to temperature cycles of 4 to 100° C. Given the loop has a volume of around 100 ml, approximately 216 cycles were obtained over 72-hours. A post-DeepWater Flow Loop "aged" sample of Inventive Example 1 was used in an additional DSL test. The results indicated that there was a reduction in performance and scale was forming at some concentrations, although both 150 ppm and 100 ppm were within the pass criteria of the test (i.e., <1 psi for 3-hours), although 100 ppm was borderline. However, as described above, the flow loop test was extremely harsh with respect to temperature cycles, whereas in the field it is traditionally a single cold-*hot-*cold cycle.

Subsequently, additional requested DSL tests on the post-DeepWater Flow Loop aged sample were performed using the following protocols: DSL with the starting dose rate of 75 ppm, repeating the same pre-scale criteria of 1 psi, followed by 3-hours of testing; and DSL with the starting dose rate of 100 ppm, repeating the same pre-scale criteria of 1 psi, followed by 3-hours of testing. Said tests were requested as it was judged that under the initial protocols, if scale was forming at a higher dosage but passed the <1 psi criteria, then the conditions under which the subsequent lower dosage was exposed to more severe conditions (i.e., an amount of pre-scale+scale which had formed at the previous dose).

Figure 5:
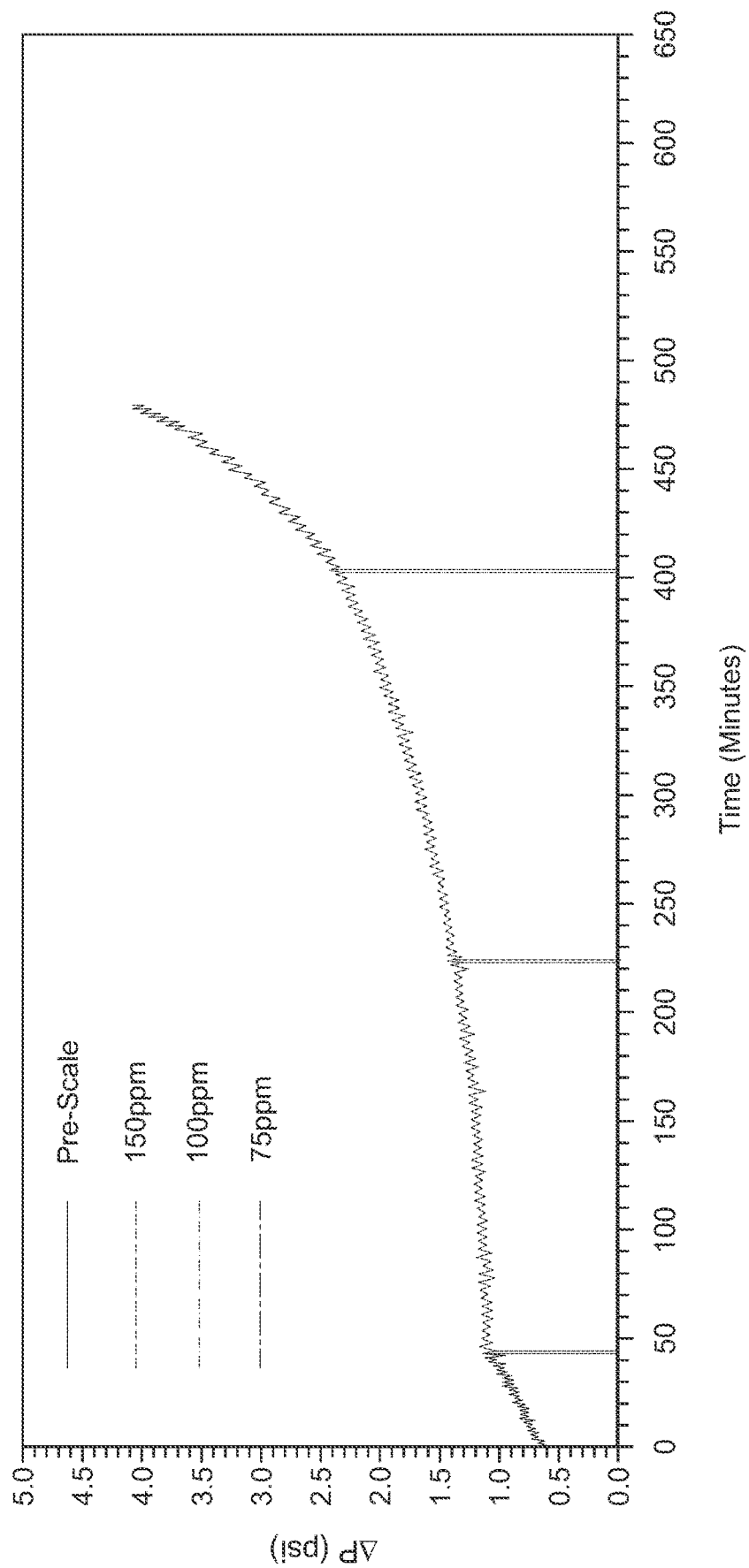
FIG. 5 is a graph illustrating a repeated DSL evaluation of Post-DeepWater Flow Loop Sample of a scale inhibitor composition disclosed herein, according to one or more examples of the disclosure.
Figure 6:
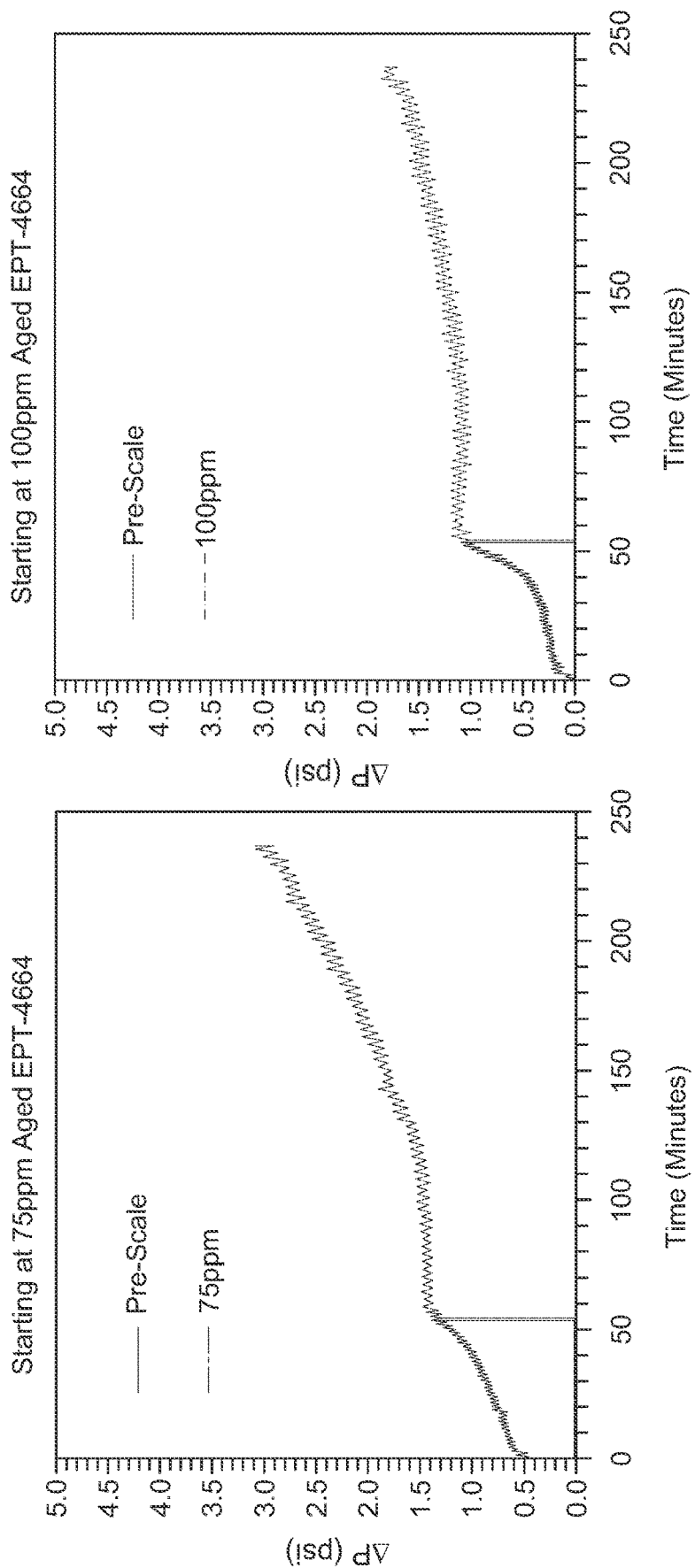
FIG. 6 is graphs illustrating a repeated DSL evaluation of Post-DeepWater Flow Loop of a scale inhibitor composition disclosed herein starting at 75 ppm (graph on lefthanded side) and 100 ppm (graph on righthanded side), according to one or more examples of the disclosure.
Figure 7:
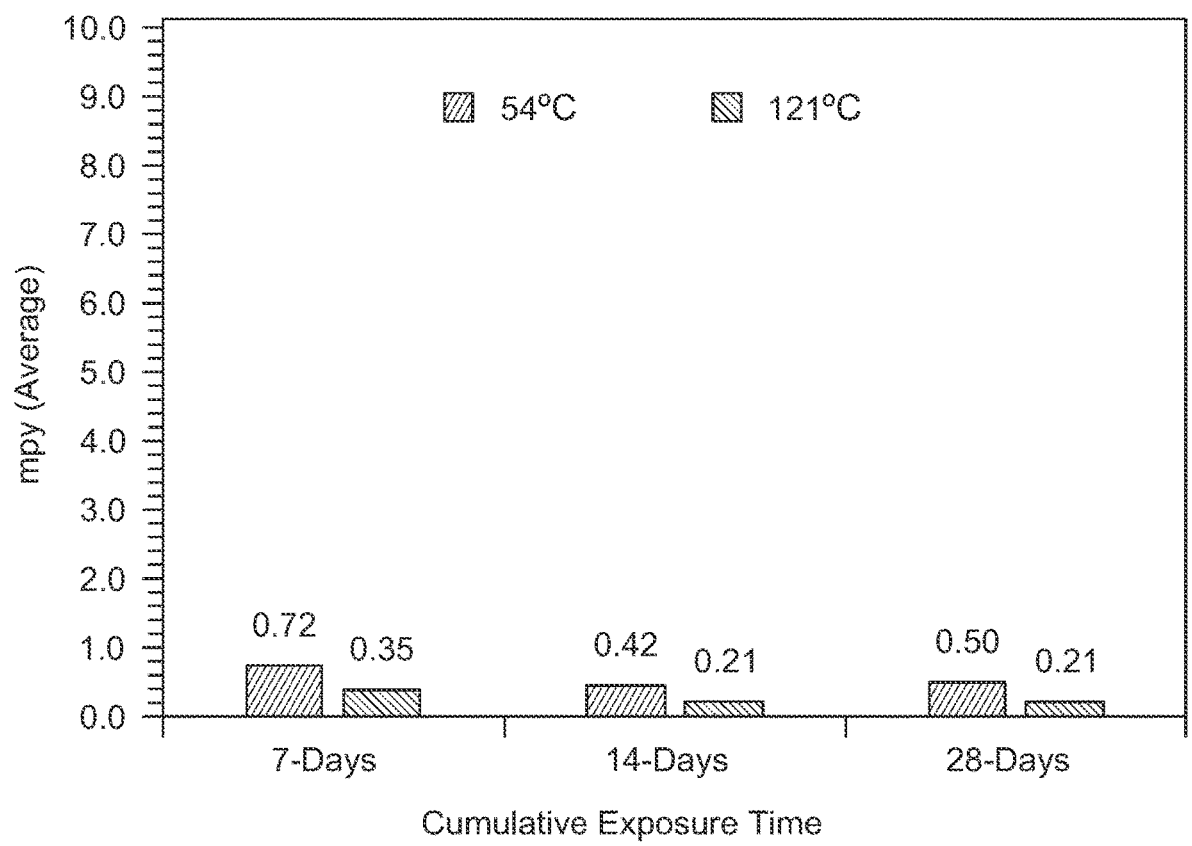
FIG. 7 is a graph illustrating Grade F22 alloy mils per year (hereinafter "mpy") (Average) at T=54 and 121° C. for a scale inhibitor composition disclosed herein, according to one or more examples of the disclosure.
Figure 8:
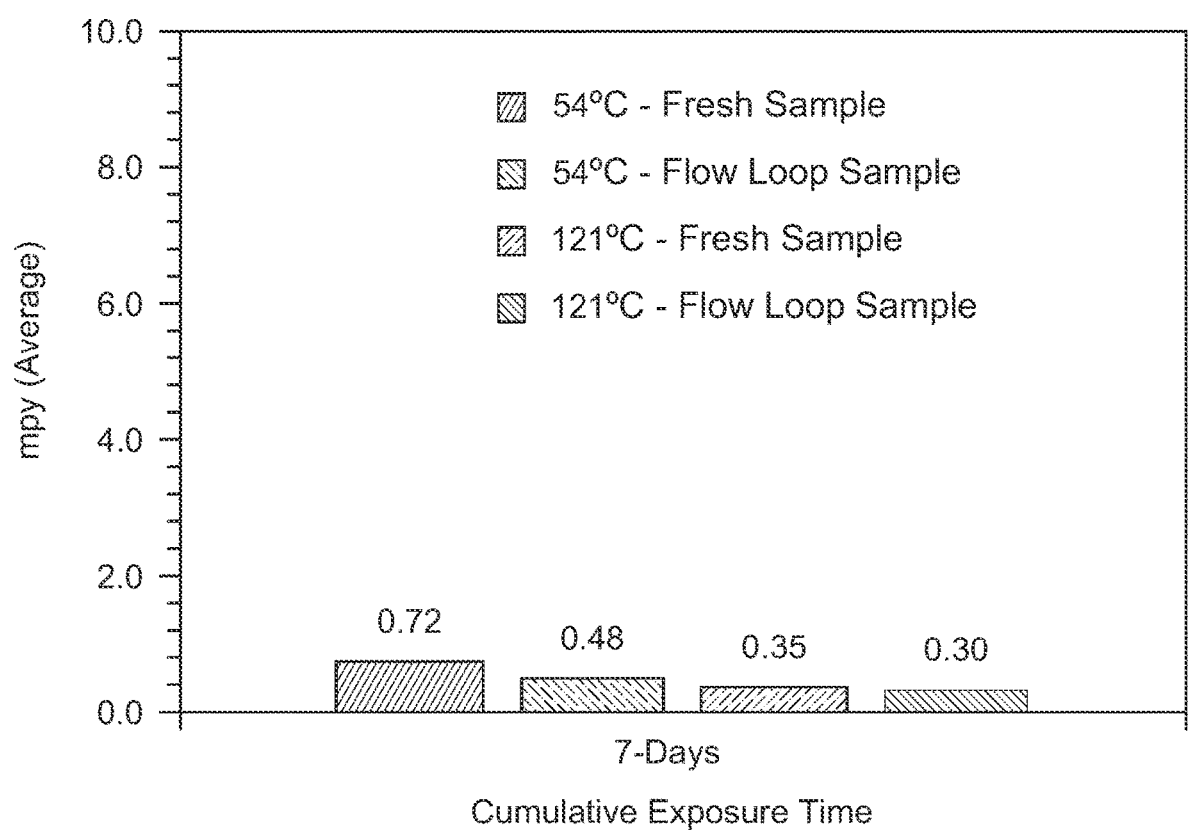
FIG. 8 is a graph illustrating Post-DeepWater Flow Loop for an aged scale inhibitor composition disclosed herein for Grade F22 alloy mpy (Average) at T=54 and 121° C., according to one or more examples of the disclosure.

As shown below, under the conditions described, 75 ppm failed towards the end of the 3-hour pass period but performed better than shown in FIG. 5, whereby scale was initially controlled for 35-minutes. The test was then repeated using 100 ppm. As shown, the onset of scaling was delayed for 45-minutes after which scaling occurred. At the end of the 3-hour pass time, the increase in ΔP was under the limit of the pass criteria.

The data and testing results for fresh Inventive Example 1 are as follows:

TABLE 6

Inventive Example 1 - Grade 22 Alloy data at T = 54° C.

| Temp. (C.) | Time (Days) | Coupon Number | Cum. Weight Loss (%) | mm/year | mpy | Coupon Visual | Solution Visual | Pass/Fail | Pass/Fail |
|---|---|---|---|---|---|---|---|---|---|
| 54 | 7 | 4 * | 0.05 | 0.02 | 0.73 | Tarnished | Darkened | Pass | Pass |
|  |  | 5 | 0.05 | 0.02 | 0.65 | Mild Tarnish | Darkened | Pass |  |
|  |  | 6 | 0.05 | 0.02 | 0.87 | Mild Tarnish | Darkened | Pass |  |
|  | 14 | 4 * | 0.06 | 0.01 | 0.45 | Tarnished | Darkened | Pass | Pass |
|  |  | 5 | 0.05 | 0.01 | 0.37 | Mild Tarnish | Darkened | Pass |  |
|  |  | 6 | 0.06 | 0.01 | 0.46 | Mild Tarnish | Darkened | Pass |  |
|  | 28 | 4 * | 0.15 | 0.01 | 0.55 | Tarnished | Darkened | Pass | Pass |
|  |  | 5 | 0.13 | 0.01 | 0.48 | Mild Tarnish | Darkened | Pass |  |
|  |  | 6 | 0.13 | 0.01 | 0.46 | Mild Tarnish | Darkened | Pass |  |

Note:
* Half of coupon was submersed

TABLE 7

Inventive Example 1 - Grade F22 alloy data at T - 121° C.

| Temp. (C.) | Time (Days) | Coupon Number | Cum. Weight Loss (%) | mm/year | mpy | Coupon Visual | Solution Visual | Pass/Fail | Pass/Fail |
|---|---|---|---|---|---|---|---|---|---|
| 121 | 7 | 10 | 0.03 | 0.01 | 0.36 | Mild Tarnish | Darkened | Pass | Pass |
|  |  | 11 * |  |  |  | Mild Tarnish | Darkened | Pass |  |
|  |  | 12 | 0.02 | 0.01 | 0.34 | Mild Tarnish | Darkened | Pass |  |
|  | 14 | 10 | 0.04 | 0.006 | 0.25 | Mild Tarnish | Darkened | Pass | Pass |
|  |  | 11 | 0.02 | 0.004 | 0.15 | Mild Tarnish | Darkened | Pass |  |
|  |  | 12 | 0.03 | 0.005 | 0.21 | Mild Tarnish | Darkened | Pass |  |
|  | 28 | 10 | 0.07 | 0.01 | 0.23 | Mild Tarnish | Darkened | Pass | Pass |
|  |  | 11 | 0.05 | 0.004 | 0.17 | Mild Tarnish | Darkened | Pass |  |
|  |  | 12 | 0.07 | 0.01 | 0.23 | Mild Tarnish | Darkened | Pass |  |

Note:
* Lid popped off bottle during 7-day Test

For the Post-DeepWater Flow Loop Samples of Inventive Example 1, additional Grade F22 alloy compatibility tests were performed for 7-days. Again, Inventive Example 1 showed excellent results with <1 mpy.

Fluid compatibility testing was conducted on Inventive Example 1 utilizing "Field" brine at 90° C., and the Inventive Example 1 was compatible across the full range of concentrations.

Initial proof of concept blank scaling tests were conducted. The averaged blank scaling time for the "Field" brine was about 145-minutes under the conditions set forth above.

For initial performance testing by DSL, the "Field" brine was first allowed to pre-scale for 100-minutes followed by application of Inventive Example 1 at reducing concentrations of 150 ppm, 100 ppm, and 75 ppm. Each concentration was held for 180-minutes. Inventive Example 1 was under the threshold of <1 psi increase at each concentration, though scale was clearly forming at 100 ppm and 75 ppm. However, the initial pre-scale conditions were harsher compared with other screened scale inhibitors. Therefore, Inventive Example 1 was re-run, and the pre-scale was stopped at about 1 psi. Under said conditions, Inventive Example 1 achieved excellent results.

Subsequently, Inventive Example 1 was tested against Grade F22 alloy and showed excellent Grade F22 alloy compatibility with <1 mpy at all tested temperatures and time steps. However, it was noted that there was a viscosity change after the High-Pressure Flow Loop Test, wherein neat Inventive Example 1 was continuously circulated in the flow loop for a period of 72-hours at 4000 psi which exposes the scale inhibitor disclosed herein to temperature cycles of 4° C. to 100° C. The post-DeepWater Flow Loop "aged" sample of Inventive Example 1 was utilized in both DSL Test and 7-day Grade F-22 alloy compatibility tests. Said test results indicated that there was a reduction in performance by DSL and scale was forming at all concentrations, although both 150 ppm and 100 ppm were within the pass criteria of the test (i.e., <1 psi for 3-hours), although 100 ppm was borderline. However, as described herein, the Flow Loop test was extremely harsh with respect to temperature cycles, whereas in the field it is traditionally only a single cold-*hot-*cold cycle. Repeating the Grade F22 alloy compatibility testing on aged Inventive Example 1 showed excellent results.

Additional DSL tests on the post-DeepWater Flow Loop aged sample were performed using the following protocols: DSL with the starting dose rate of 75 ppm, repeating the same pre-scale criteria of 1 psi, followed by 3-hours of testing; and DSL with the starting dose rate of 100 ppm, repeating the same pre-scale criteria of 1 psi, followed by 3-hours of testing.

Said tests judged that if, under the initial protocols, scale was forming at a higher dosage but passed the <1 psi criteria, then the conditions under which the subsequent lower dosage was exposed to was more severe (i.e., the amount of pre-scale+scale which had formed at the previous dose).

Under the conditions disclosed herein, 75 ppm failed towards the end of the 3-hour pass period, but performed better than under the original protocols, whereby scale was initially controlled for 35-minutes. The test was then repeated using Inventive Example 1 at a concentration of 100 ppm. The onset of scaling was delayed for 45-minutes after which scaling occurred. However, at the end of the 3-hour pass time, the increase in ΔP was on under limit of the pass criteria, showing improved performance compared with results using the original protocols. Accordingly, Inventive Example 1 at a concentration of about 100 ppm achieved excellent test results under the "Field" conditions disclosed herein.

In summary, the scale inhibitor compositions disclosed herein may be contacted with one or more metal surfaces, such as, but not limited to, metal surfaces in refinery distill towers as well as metal surfaces in one or more downhole environments. A method of treating a subterranean hydrocarbon producing formation with the scale inhibitor compositions disclosed herein may include at least contacting subterranean producing formations with the scale inhibitor compositions disclosed herein that are compatible with one or more alloy metals, such as, but not limited to, Grade F22 alloy. In some embodiments, the scale inhibitor compositions disclosed herein may be at least usable in one or more other sub-sea, deep-water, and/or wellbore applications under similar or substantially similar conditions.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A composition for treating a subterranean hydrocarbon producing formation and/or oilfield equipment, the composition comprising:
    a scale inhibitor comprising an acrylic acid terpolymer at a concentration greater than about 35 weight percent (wt. %) of a total weight of the composition, wherein the acrylic acid terpolymer comprises one or more acrylate subunits, one or more vinyl sulphonate subunits, and one or more phosphonate end-caps;
    a corrosion inhibitor comprising at least one acid;
    a neutralizing agent; and
    a solvent, wherein a ratio of a total amount of the acrylic acid terpolymer to a total amount of the solvent ranges from about 1:1 to about 1:3.

2. The composition of claim 1, wherein the at least one acid is phosphoric acid.

3. The composition of claim 1, wherein the neutralizing agent is at least one amine-based neutralizing agent comprising diethanolamine, monoethanolamine, or any combination thereof.

4. The composition of claim 1, wherein the solvent comprises ethylene glycol.

5. The composition of claim 4, wherein the solvent ranges from more than about 40 wt. % to less than about 65 wt. % of the total weight of the composition.

6. The composition of claim 1, wherein the scale inhibitor is the acrylic acid terpolymer, the corrosion inhibitor is phosphoric acid, and the neutralizing agent is an amine-based neutralizing agent.

7. The composition of claim 6, wherein the solvent is ethylene glycol.

8. The composition of claim 7, wherein the ethylene glycol ranges from more than about 40 wt. % to less than about 65 wt. % of the total weight of the composition.

9. The composition of claim 1, wherein the scale inhibitor consists essentially of the acrylic acid terpolymer.

10. The composition of claim 1, wherein the acrylic acid terpolymer has a molecular weight (Mw) ranging from about 4000 g/mol to about 7000 g/mol.

11. The composition of claim 1, wherein the solvent consists of ethylene glycol.

12. The composition of claim 1, wherein the concentration of the acrylic acid terpolymer is less than about 50 weight percent (wt. %) of the total weight of the composition.

13. A method of inhibiting corrosion of metal surfaces, the method comprising:
    contacting at least one metal surface with a composition comprising:
        a scale inhibitor comprising an acrylic acid terpolymer at a concentration greater than about 35 weight percent (wt. %) of a total weight of the composition, wherein the acrylic acid terpolymer comprises one or more acrylate subunits, one or more vinyl sulphonate subunits, and one or more phosphonate end-caps;
        a corrosion inhibitor comprising at least one acid;
        a neutralizing agent; and
        a solvent, wherein a ratio of a total amount of the acrylic acid terpolymer to a total amount of the solvent ranges from about 1:1 to about 1:3.

14. The method of claim 13, wherein
the at least one acid of the corrosion inhibitor comprises at least phosphoric acid.

15. The method of claim 14, wherein the neutralizing agent is an amine-based neutralizing agent, and the solvent comprises ethylene glycol.

16. The method of claim 15, wherein the amine-based neutralizing agent comprises diethanolamine, monoethanolamine, or any combination thereof.

17. The method of claim 13, wherein the concentration of the acrylic acid terpolymer is less than about 50 weight percent (wt. %) of the total weight of the composition.

18. A method of treating a subterranean hydrocarbon producing formation with corrosion inhibiting composition, the method comprising:
    contacting a subterranean zone of the subterranean hydrocarbon producing formation with a composition such that a corrosive effect of an acidizing composition on metal surfaces in contact therewith are reduced, wherein the composition comprises:
        a scale inhibitor comprising an acrylic acid terpolymer at a concentration greater than about 35 weight percent (wt. %) of a total weight of the composition, wherein the acrylic acid terpolymer comprises one or more acrylate subunits, one or more vinyl sulphonate subunits, and one or more phosphonate end-caps;
        a corrosion inhibitor comprising at least one acid;
        an amine-based neutralizing agent; and
        a solvent, wherein a ratio of a total amount of the acrylic acid terpolymer to a total amount of the solvent ranges from about 1:1 to about 1:3.

19. The method of claim 18, wherein the at least one acid comprises at least phosphoric acid and the amine-based neutralizing agent comprises diethanolamine, monoethanolamine, or any combination thereof.

20. The method of claim 18, wherein the concentration of the acrylic acid terpolymer is less than about 50 weight percent (wt. %) of the total weight of the composition.

* * * * *